(12) United States Patent
Jackson et al.

(10) Patent No.: US 9,225,787 B2
(45) Date of Patent: Dec. 29, 2015

(54) GEOLOCATION BASED RESOURCE FINDER

(75) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 439 days.

(21) Appl. No.: 13/565,744

(22) Filed: Aug. 2, 2012

(65) Prior Publication Data
US 2015/0172395 A1 Jun. 18, 2015

(51) Int. Cl.
*H04L 29/08* (2006.01)
(52) U.S. Cl.
CPC ............... *H04L 67/18* (2013.01); *H04L 67/10* (2013.01)
(58) Field of Classification Search
CPC ......... H04L 51/20; H04L 67/10; H04L 67/18; G06Q 50/01; G06Q 30/0261; G06F 17/30041
USPC .......................................... 709/204, 205, 206
See application file for complete search history.

(56) References Cited

U.S. PATENT DOCUMENTS

| | | | |
|---|---|---|---|
| 6,202,023 B1 * | 3/2001 | Hancock et al. | 701/516 |
| 6,317,718 B1 * | 11/2001 | Fano | 705/14.39 |
| 6,912,398 B1 * | 6/2005 | Domnitz | 455/461 |
| 2009/0319166 A1 | 12/2009 | Khosravy et al. | |
| 2011/0143776 A1 | 6/2011 | Shankaranarayanan et al. | |
| 2012/0088524 A1 * | 4/2012 | Moldavsky et al. | 455/456.3 |
| 2012/0096490 A1 * | 4/2012 | Barnes, Jr. | 725/34 |
| 2012/0129553 A1 * | 5/2012 | Phillips et al. | 455/456.3 |
| 2013/0073388 A1 * | 3/2013 | Heath | 705/14.53 |
| 2013/0073400 A1 * | 3/2013 | Heath | 705/14.73 |
| 2013/0073473 A1 * | 3/2013 | Heath | 705/319 |
| 2013/0191388 A1 * | 7/2013 | Bernhardt et al. | 707/737 |
| 2013/0226628 A1 * | 8/2013 | Scher et al. | 705/5 |
| 2013/0311340 A1 * | 11/2013 | Krishnan | 705/27.2 |

OTHER PUBLICATIONS

Lambert, "Google Latitude, now with Location History & Alerts", Google Mobile Blog, Nov. 10, 2009, retrieved from <http://googlemobile.blogspot.com/2009/11/google-latitude-now-with-location.html>.
"The real world, now in real-time! Say hi to foursquare Radar!", Foursquare Blog, Oct. 12, 2011, retrieved from <http://blog.foursquare.com/2011/10/12/the-real-world-now-in-real-time-say-hi-to-foursquare-radar/>.
"Waypoint Pro", AppBrain, last viewed Aug. 2, 2012, retrieved from <http://www.appbrain.com/app/waypoint-pro/com.thedroiddev.waypointpro>.

* cited by examiner

*Primary Examiner* — Uzma Alam
(74) *Attorney, Agent, or Firm* — Dority & Manning, P.A.

(57) ABSTRACT

Techniques for enabling users of a social networking application or service to share information and additional resources with other users of the service are provided. A content item from a first user of the social networking service is registered as a resource within the social networking service. In response to receiving a query for the content item from a second user of the social networking service, the availability of the resource associated with the first user is determined for use by the second user. A notification indicating the availability of the resource is sent to a device of the second user. The notification may include a current geographic location of the first user, which can be graphically represented on a digital map displayed at the device of the second user.

19 Claims, 5 Drawing Sheets

GEOLOCATION BASED RESOURCE FINDER

FIELD

The present disclosure relates generally to geolocation based services, and, more particularly, to determining geographic locations of resources for a geolocation based service.

BACKGROUND

The advancement of modern communication services and mobile devices have allowed users to share information quickly and easily amongst one another. For example, location-based services enable a user of a mobile device integrated with Global Positioning System (GPS) receivers to locate geographic points of interest on a digital map via a geolocation application executing at the user's mobile device. Furthermore, the user may use the geolocation application to locate other users who also have mobile devices with GPS receivers and who also have chosen to enable location-based services and share their respective locations via the application.

SUMMARY

The disclosed subject matter relates to enabling users of a social networking application or service to share information and additional resources with other users of the service. In an example method, a content item from a first user of the social networking service is registered as a resource within the social networking service. The registered resource is stored by the social networking service in association with a geographic location of the first user. In response to receiving a query for the content item from a second user of the social networking service, the availability of the resource associated with the first user is determined for use by the second user. A notification indicating the availability of the resource is sent to a device of the second user. The notification includes the geographic location of the first user, which can be graphically represented on a digital map displayed at the device of the second user.

The disclosed subject matter also relates to a machine-readable medium comprising instructions stored therein, which when executed by a processor, causes the processor to perform operations comprising: registering a content item from a first user of a social networking service as a resource within the social networking service, the registered resource being stored by the social networking service in association with a geographic location of the first user; in response to receiving a query for the content item from a second user of the social networking service, determining whether a geographic location of the second user is within a predetermined distance of the geographic location of the first user; when the geographic location of the second user is determined to be within the predetermined distance of the geographic location of the first user, determining whether the resource associated with the first user is available for the second user based on one or more filtering parameters defined for the resource by the first user in the social networking service; when the resource is determined to be available, sending an availability notification indicating the determined availability of the resource to a device of the second user, the availability notification including the geographic location of the first user to be graphically represented on a digital map displayed at the device of the second user; and when the resource is determined to be unavailable, registering the query received from the second user within the social networking service. The availability notification indicating the availability of the resource is sent to the device of the second user after a subsequent determination of the availability of the resource has been made, the subsequent determination indicating the resource is available.

The disclosed subject matter further relates to a system comprising a processor and a memory accessible to the processor. The processor is configured to perform functions, including functions to: register a content item from a first user of a social networking service as a resource within the social networking service, the registered resource being stored by the social networking service in association with a geographic location of the first user; receive a query for the content item from a second user of the social networking service; determine whether a geographic location of the second user is within a predetermined distance of the geographic location of the first user; determine whether the resource associated with the first user is available for the second user based on a determination that the geographic location of the second user is within the predetermined distance of the geographic location of the first user and one or more filtering parameters defined for the resource by the first user in the social networking service, the one or more filtering parameters including a geographic location of interest and a period of time defined by the first user via an interface of the social networking service; register the query received from the second user within the social networking service based on an initial determination that the resource is unavailable; and send an availability notification indicating the determination of availability of the resource to a device of the second user based on a subsequent determination that the resource is available. The availability notification includes the geographic location of the first user to be graphically represented on a digital map displayed at the device of the second user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The disclosed subject matter relates to enabling users of a social networking application or service to share information and additional resources with other users of the service. The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology as described herein enables users of a social networking application or service to share information and additional resources with other users of the service are provided. In an example, a content item from a first user of the social networking service is registered as a resource within the social networking service. In response to receiving a query for the content item from a second user of the social networking service, the availability of the resource associated with the first user is determined for use by the second user. A notification indicating the availability of the resource may be sent to a device of the second user. The notification may include a current geographic location of the first user, which can be graphically represented on a digital map displayed at the device of the second user.

The terms "social networking service" and "social networking application" are used herein to refer to any unit of software functionality that provides users of such a social networking service/application with a capability to declare different lists or groups of social contacts representing, for example, real-world social connections of the respective users of the social networking service. For example, each user may define a list or grouping of social connections corresponding to the user's family members and another list of users corresponding to various colleagues associated with the user's workplace. The social connections of a user may be represented using, for example, a social graph associated with a profile stored for the user in the social networking service. As will be described in further detail below, the functionality of the social networking service may be exposed to another service, application, process or system over a local area network, medium area network or wide area network. An example of such a network can include, but is not limited to, a private network or the Internet or World Wide Web. In one example, the functionality of the social networking service may be provided by a server device through a network to one or more clients via an interface at each of the respective clients. In some implementations, the clients may be mobile devices of the respective users of the social networking service, and each mobile device may be capable of providing location-based services for a social networking client application executable at the device.

Figure 1:
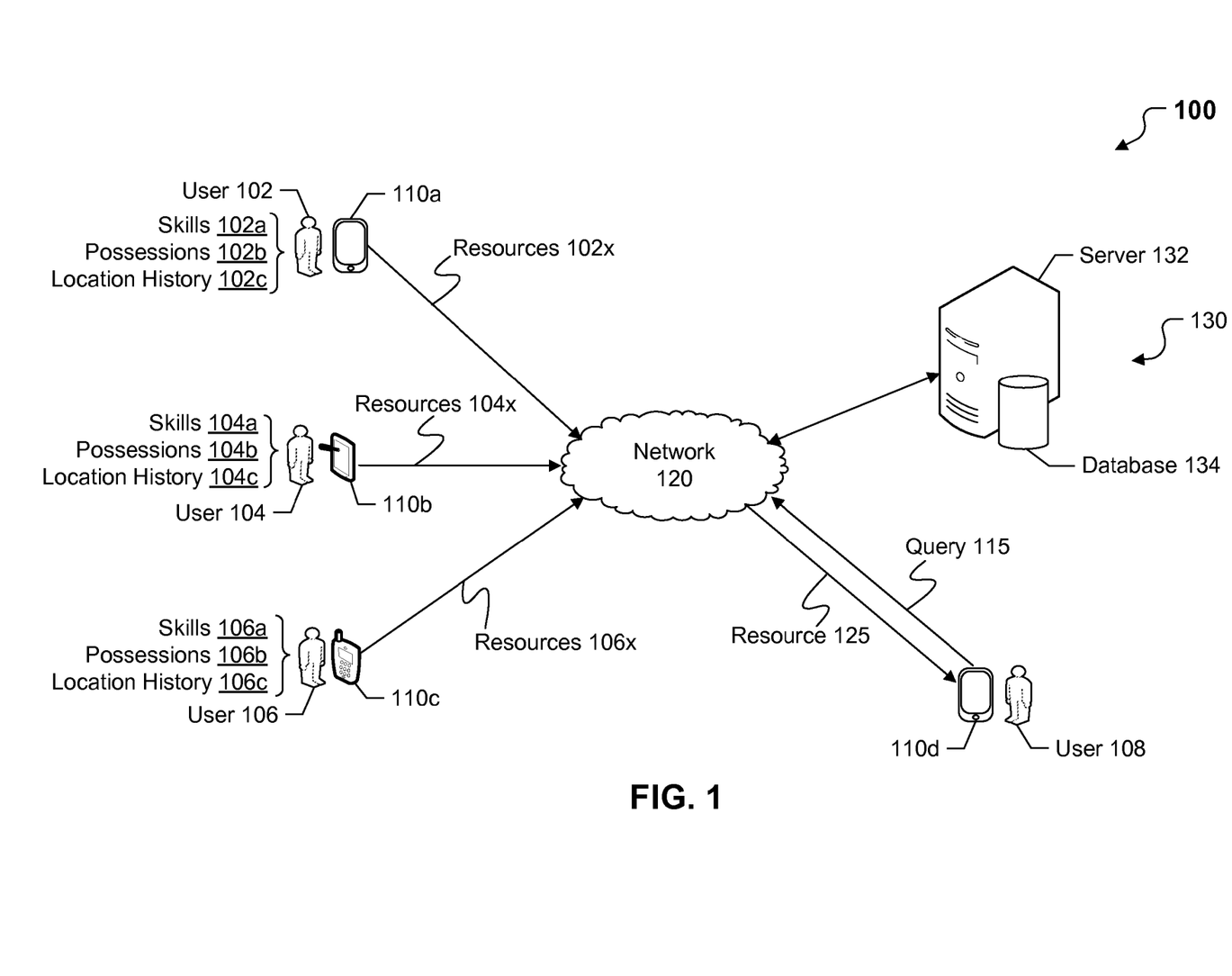
FIG. 1 is a diagram of an example network environment suitable for practicing an implementation of the subject technology.

FIG. 1 is a diagram of an example network environment 100 suitable for practicing an implementation of the subject technology. Network environment 100 includes computing devices 110a, 110b, 110c and 110d (hereinafter "devices 110a-d"), and a computing system 130. Devices 110a-d communicate with one or more servers 132 of computing system 130, for example, through network 120. As shown in FIG. 1, computing system 130 includes at least one server device 132 and at least one computer-readable storage device or database 134. Although only server 132 and database 134 are shown in FIG. 1, additional servers and/or databases may be used as may be necessary or desired for a particular implementation. Further, server(s) 132 are communicatively coupled to database(s) 134. Database 134 may store any type of data accessible by server(s) 132 including, for example, various content items registered as resources associated with users 102, 104 and 106, as will be described in further detail below.

Devices 110a-d can be any type of computing device with at least one processor, local memory, display, and one or more input devices (e.g., a mouse, QWERTY keyboard, touch-screen, microphone, or a T9 keyboard). Examples of different computing devices that may be used to implement any of devices 110a-d include, but are not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Alternatively, each of devices 110a-d can be a specialized computing device such as, for example, a mobile handset or tablet computer. Similarly, server 132 can be implemented using any general-purpose computer capable of serving data to any of devices 110a-d. Examples of computing devices that may be used to implement server 132 include, but are not limited to, a web server, an application server, a proxy server, a network server, or a group of computing devices in a server farm.

In some aspects, each of the computing devices 110a-d may communicate wirelessly through a communication interface (not shown), which may include digital signal processing circuitry where necessary. The communication interface may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, e.g., using a Bluetooth, WiFi, or other such transceiver.

In some implementations, network environment 100 can be a distributed client/server system that spans one or more networks such as network 120. Network 120 can be any network or combination of networks that can carry data communication. Such a network can include, but is not limited to, a cellular network, a local area network, medium area network, and/or wide area network such as the Internet, or a combination thereof for communicatively coupling any number of mobile clients, fixed clients, and servers. In some aspects, each of devices 110a-d can communicate with server 132 via a virtual private network (VPN), Secure Shell (SSH) tunnel, or other secure network connection. In some aspects, network 120 may further include a corporate network (e.g., intranet) and one or more wireless access points.

In an example, users 102, 104, 106 and 108 and other users (not shown) may be users of a social networking service or site. The social networking service may provide each user with a capability to declare different lists or groups of social contacts based on, for example, a real-world social connection between the user and other users of the social networking service. For example, each user may define a list or grouping of social connections corresponding to the user's family members and another list of users corresponding to various colleagues associated with the user's workplace. Other examples of different social groups or categories of social contacts declared by a user may include, but are not limited to, friends, former classmates or any custom grouping of different social contacts of the user. The members of such a social group may be represented by, for example, different social connections of a social graph associated with the user in the social networking service.

In some implementations, the social networking service may be integrated with a geolocation application executable at each of devices 110a-d for providing various location based services to users 102, 104, 106 and 108. Devices 110a-d each may execute a different implementation of the geolocation application depending on the type or computing platform of the respective device. For example, the application may be implemented for a particular mobile device platform or operating system. Additionally or alternatively, the geolocation may be implemented as a platform independent web application provided through a web browser executable at each of devices 110a-d. Such a browser-executable geolocation application may be configured to display a map and information corresponding to the geographic location of users 102, 104, 106 or 108 via a web page loaded within the browser. Application functionality within the web page may be implemented using any of various browser-supported programming languages including, but not limited to, JavaScript, VBScript, HTML, or other type of language for writing web pages. However, the geolocation application as described herein is not intended to be limited to web browsers and may be implemented using a standalone application capable of providing location based services.

In an example, the geolocation application may enable each of users 102, 104, 106 and 108 to share a current (or last known) geographic location with other users of the geolocation application via network 120. The geographic location of each user or each of devices 110a-d may be determined based on location information derived from various sources including, but not limited to, GPS (e.g., providing latitude/longitude coordinates of a geographic location), cell towers in a cellular or mobile communications network or WiFi access points. For example, each of devices 110a-d may include one or more network interface device(s) for enabling cellular and/or wireless Internet (WiFi) data communications. Thus, any of devices 110a-d or computing system 130 can lookup an identifier of a cellular antenna or WiFi transmitter in a database that correlates identifiers to locations. Further, time difference of arrival data can be used to perform a multi-lateration operation to determine a location for a computing device. WiFi signal strength also can be used to refine a location of a computing device (e.g., the signal strength may be proportional to a distance between the computing device and the WiFi transmitter, or a particular pattern of signal strengths may indicate a particular location). Additionally or alternatively, one or more of devices 110a-d may include a GPS receiver for receiving geo-positioning information from one or more GPS systems. Thus, location data associated with a device (e.g., device 110a) may include GPS coordinates registered by a GPS receiver of the device or a geographic location derived from a network location provider (e.g., a wireless communication service provider).

In some implementations, the geolocation application executing at devices 110a-d may provide an interface enabling each of users 102, 104, 106 and 108, respectively, to register themselves as resources of certain skill-sets, possessions, or information to other users of the geolocation application or social networking service. As shown in the example of FIG. 1, users 102, 104 and 106 may use the interface of the application to register resources 102x, 104x and 106x, respectively, with computing system 130 via network 120. For example, the geolocation application executing at each of devices 110a, 110b and 110c may be communicatively coupled to computing system 130 via network 120. As such, each device may be configured to send a request message to computing system 130 via network 120 based on user input received via the interface of the geolocation application. The request message may include one or more content items related to resources 102x, 104x or 106x being registered by users 102, 104 and 106, respectively.

In an example, user 102 may register a set of resources 102x, as shown in FIG. 1. which may include, for example, information related to a set of skills 102a associated with the user. For example, the set of skills 102a may be related to the user's profession. In an example, the information registered by user 102 may include profile information identifying the user as a medical doctor. This information may be provided by computing system 130 to other users of the geolocation application. Such other users may be nearby and in need of a doctor, and thus, may utilize the geolocation application to locate and contact user 102 via the geolocation application executing on their respective computing devices. In a further example, user 104 may register information related to one or more of the user's possessions 104b (e.g., lawn equipment or power tools), thereby registering user 104 as an owner of the particular possessions 104b.

In some implementations, computing system 130 may be used by the social networking service, as described above, to share the information registered for each user with other users of the social networking service. In an example, the registered resources for each user may be stored as different attributes in association with a profile of the respective user in the social networking service. As will be described in further detail below with respect to FIG. 2, the stored resource information for a user may be stored in database 134 and later retrieved by server 132 or another server associated with the social networking service for distribution to one or more other users of the social networking service, who may be searching for a particular resource associated with the user.

Figure 2:
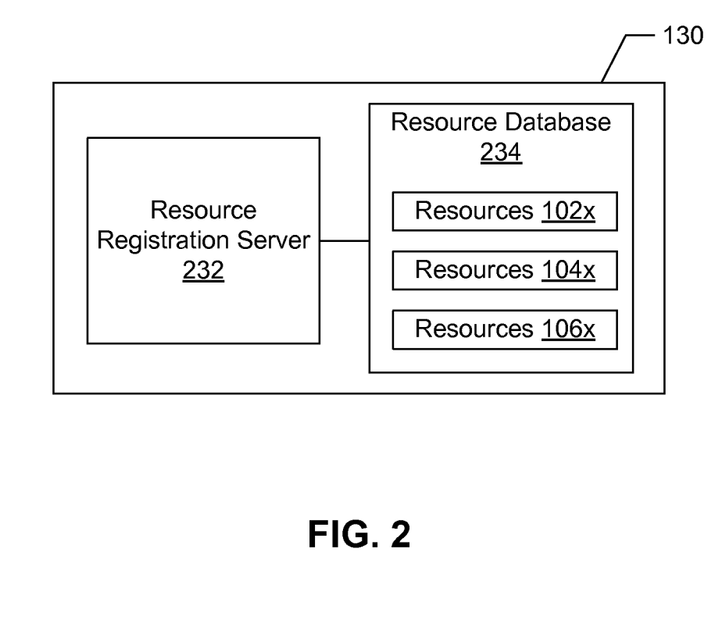
FIG. 2 illustrates an example computing system for enabling users of a geolocation application to register and share resources with other users of the application.

FIG. 2 illustrates an example of computing system 130 for enabling users of a geolocation application to register and share resources with other users of the application, as described above. While the example computing system of FIG. 2 will be described using network environment 100 of FIG. 1, it is not intended to be limited thereto. In this example, the computing system 130 may be a resource registration and management system for registering content items as resources and sharing information related to the available resource between different users of the geolocation application or social networking service, as described above. As shown in FIG. 2, the resource registration system includes a resource registration server 232 (e.g., server 132 of FIG. 1) and a resource database 234 (e.g., database 134 of FIG. 1).

In some implementations, resource registration server 232 may be configured to register a content item provided by a user of the geolocation application as a resource associated with the user in resource database 234. Further, resource registration server 232 and resource database 234 enable sharing of resource information between different users of the social networking service (e.g., via the geolocation application). Referring back to the example of FIG. 1, resource database 234 may be used to store the registered resources 102x, 104x and 106x for users 102, 104 and 106, respectively. For example, the registered resources for each user may be stored in database 234 in association with a profile of the respective user in the social networking service. The registered resources for each user also may be stored in association with, for example, a geographic location obtained for the user (or the user's mobile device), as described above.

In some implementations, resource registration server 232 may be configured to receive a query from a second user of the social networking service for a content item registered as a resource for a first user. For example, as shown in FIG. 1, user 108 may submit a query 115 requesting one or more content items that have been registered as resources, e.g., resources 102x, 104x and 106x for users 102, 104 and 106, respectively, in resource database 234. The query 115 or request for a content item may be submitted based on input received from user 108 via a search engine interface of the geolocation application or other application executable at device 110d. Although not shown in the example illustrated in FIG. 1, the geolocation application executable at devices 110a, 110b and 110c also may enable users 102, 104 and 106, respectively, to submit similar queries for content items that may be available from various resources (e.g., other nearby users of the geolocation application) that are registered in the resource registration system 130.

Using the above-described example of lawn equipment or tools registered for user 104, user 108 (e.g., a neighbor of user 104) may be in need of such equipment or tools. Thus, query 115 submitted by user 108 via the geolocation application executing at device 110d may identify a particular piece of equipment or tool owned by user 104. Further, resource registration system 130 may process query 115 and return a response including information identifying a resource 125 based on the processed query 115. Resource 125 may correspond to, for example, the particular equipment or tool in the possessions 104b registered for user 104. The information sent from resource registration system 130 to device 110d may include a geographic location of user 104 and/or contact information associated with user 104, which user 108 may use to contact user 104, e.g., to request a convenient time to borrow the particular piece of equipment or tool.

In a further example, the geolocation application may allow users to specify a condition for restricting or controlling the availability or visibility of user-registered attributes or items (e.g., registered resources 102x, 104x or 106x) within the social networking service. Thus, the first user or owner in the above-described example may be able to restrict the visibility of the registered ownership information with respect to a resource (e.g., lawn equipment or other physical possession owned by the first user) to only a limited number or predefined group of users. Such a predefined group of users may include, for example, members of a social group (e.g., the user's neighbors) associated with the user in the social networking service, who are also users of the social networking service, as described above.

In some implementations, when the resource is determined to be unavailable, query 115 may be registered for the second user within the social networking service. In this case, the availability notification indicating that a requested item is available is sent from computing system 130 (or resource registration system 130) to the requesting user's (108) device 110d only upon a determination that the resource has become available. This may be, for example, a subsequent determination made following an initial determination that may have been made by system 130 in response to receiving the query 115 initially. In an example, query 115 initiated by the second user 108 may be registered by computing system 130. Computing system 130 may subsequently send a "push" notification indicating the availability of the resource when, for example, another user has just registered a content item (e.g., a skill, possession or location) or has just come within a predetermined distance or range relative to the second user's 108 current geographic location. In a different example, computing system 130 may send an availability notification immediately in response to query 115 made by the user 108 (e.g., who may be actively querying computing system 130 so as to "pull" or "poll" information related to the availability of a content item or registered resource from computing system 130).

Figure 3:
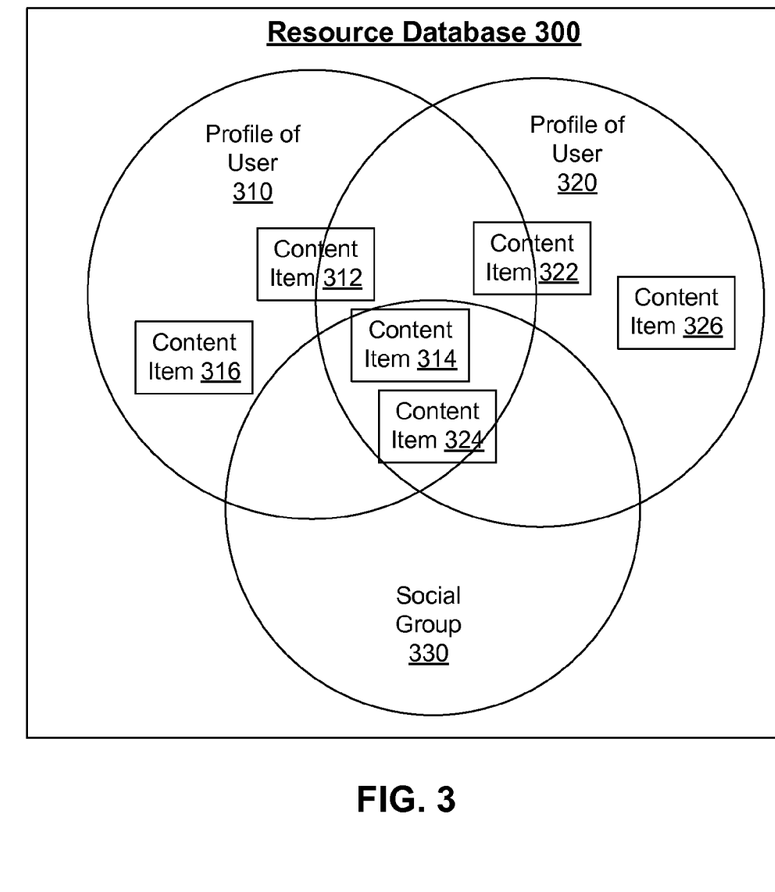
FIG. 3 illustrates an example resource database of a social networking service for sharing stored content items associated with different users of the social networking service.

FIG. 3 illustrates an example resource database 300 of a social networking service for sharing stored content items associated with different users of the social networking service. As shown in the example of FIG. 3, the resource database 300 includes a profile of user 310, a profile of user 320, and a social group 330 including users 310 and 320, all of which are associated with a social networking service. Users 310 and 320 may correspond to, for example and without limitation, users 102 and 108, respectively, of FIG. 1, as described above. In addition to users 310 and 320, social group 330 may include additional users (not shown) who also are members of social group 330.

Users 310, 320 and other users of the social group may share various content items with each other individually and with social group 330 (including all members of social group 330) in general. In some implementations, the content items being shared are registered resources associated with the respective profiles of users 310 and 320. In an example, user 310 may share a content item 312 with user 320, thereby granting user 320 permission to view content item 312 associated with the individual profile of user 310. Similarly, user 320 may share a content item 322 with user 310, thereby granting user 310 permission to view content item 322 associated with the individual profile of user 320.

Further, user 310 may share content item 314 with social group 330, thereby enabling user 320 (and other members of social group 330) to view content item 314 automatically. Similarly, user 320 may share content item 324 with social group 330, thereby enabling user 310 (and the other members) to view content item 324 automatically. Some content items (e.g., content items 316 and 326) are associated with the individual profiles of the respective users (users 310 and 320) only. If a user other than user 310 or 320 is added to social group 330 at a later time, user 310 and user 320 each may have the option of not having their respective content items 314 and 324 automatically shared with the new user or the social group 330.

Returning now to FIG. 2, resource registration server 232 may be configured to determine the availability of a registered resource (e.g., resource 102x) associated with a first user (e.g., user 102 of FIG. 1, as described above) of the social networking service in response to receiving a query (e.g., query 115 of FIG. 1) for the resource or related content item from a second user (e.g., user 108 of FIG. 1). The first user in this example may be registered in the social networking service as a provider of a particular resource, e.g., a doctor providing medical skills or owner of physical equipment who provides loaner services. The query may be initiated by the second user via, for example, an interface of the geolocation application executable at the second user's mobile device (e.g., device 110a of FIG. 1). Resource registration server 232 may then send an availability notification indicating the determined availability of the resource to a mobile device of the requesting second user.

In some implementations, the availability notification indicating the determined availability of the resource is sent to the mobile device of the second user via a network (e.g., network 120 of FIG. 1, as described above) only when the resource is determined to be available. If the requested resource is determined to be available, resource registration server 232 may then identify a current, last-known or best-available geographic location of the first user for which the queried resource is registered. As described above, the geographic location of the first user may have been determined using any of various techniques based on various network technologies (e.g., GPS, WiFi, cellular network etc.). The availability notification sent from resource registration server 232 to the second user's mobile device may include, for example, the identified geographic location of the first user. The geolocation application at the second user's device may be configured to display a graphical representation of the first user's (or resource provider's) location, as indicated in the notification from resource registration server 232. For example, a visual marker or graphics icon indicating the first user's location may be provided on a digital map being displayed at the second user's mobile device (e.g., via a content area of the geolocation application). In some implementations, the availability notification is sent only when the identified geographic location of the first user is determined to be nearby or within a predetermined distance of the requesting user's mobile device current geographic location.

In an example, resource registration server 232 may send a separate notification alerting the first user or registered owner/provider of a queried or requested resource that the second user is requesting permission to utilize the particular resource registered as being owned or provided by the first user. In response to the notification, the first user may be presented with an option at the user's device (e.g., via the geolocation application) to either grant or deny the user's location or contact information to be shared to the requesting (second) user (e.g., in order for the second user to contact the first user to request a convenient time to borrow a particular tool or piece of equipment owned by the first user).

As noted above, the registered resource owner or provider (first user) in the above example may apply one or more availability filters that allow this first user to control or limit the availability of the registered resources associated with the first user. The use of such availability filters may allow the first user to limit the visibility of one or more of the registered resources to only certain users of the social networking service. The first user may specify individual users with whom each registered resource is made available or visible via an interface of the geolocation application. As described above, the individual users may be one or more members of a selected social group defined by the resource provider in the social networking service.

Examples of different availability filters that a user identified as a provider of one or more registered resources may use to restrict the availability of the resources with respect to other users may include, but are not limited to, the user's current location or geographic point of interest (e.g., allow a resource to be available when the resource provider is located within some public buildings but not in a stadium or arena), proximity to other users (e.g., limit availability to only other users within a predetermined distance of the resource provider's current location), and population density (e.g., allow the resource to be available when the resource provider is visiting a public park but not a sporting event). In addition, the user (resource provider) may choose to register information related to the user's location history but restrict the information to names of locations without revealing dates or time frames.

In an example, a number of availability filters may be applied for the user and the user's registered resources based on various parameters that may be defined by the user. Examples of different filtering parameters that may be used include, but are not limited to, type of requestor or user making an information request (e.g., friends and social groups in the social networking service vs. public users within a predetermined distance to the user's current location), customary locations (e.g., reveal the user's availability only when the user is located at home), public locations (e.g., reveal availability when the user has checked into a public event via the application or social networking service), unusual locations (e.g., indicate the user is unavailable for lending any possessions while traveling to a different city), and time of day (e.g., only visible during weekdays or particular hours of the day).

In a further example, a different user submitting a query for a particular resource of interest may define similar filters or parameters for limiting the user's query to resources associated with particular users in accordance with the filters, as described above. For example, the user may specify in a query submitted to resource registration server 232 that available resources associated with only users within a particular social group or within a certain proximity to the requesting user's current geographic location should be returned. In some implementations, the above-described availability filters and filtering parameters for registering resources or submitting queries for registered resources may be defined by each user via an interface of the geolocation application executable at each user's respective mobile device. Further, information related to such user-defined filters or parameters may be included within, for example, a request message received by resource registration server 232. In addition, the request message may be sent from a user's device either for registering the content item(s) or resource(s) for the user or alternatively, for querying the availability of particular resources that may be registered (e.g., within resource database 234) for one or more other users.

In some implementations, resource registration server 232 may be configured to present targeted advertisements to different users via the geolocation application executing at the users' respective mobile devices. Such advertisements may be sent by resource registration server 232 through the network to a user's mobile device in response to queries for particular resources that may be initiated by the user using the geolocation application. For example, if a user submits a query to other nearby users (e.g., members of a social group associated with the user in the social networking service) to request information on the availability of a particular power tool, advertisements for local tool rental locations or hardware stores may be served to the user's mobile device via the geolocation application.

Figure 4:
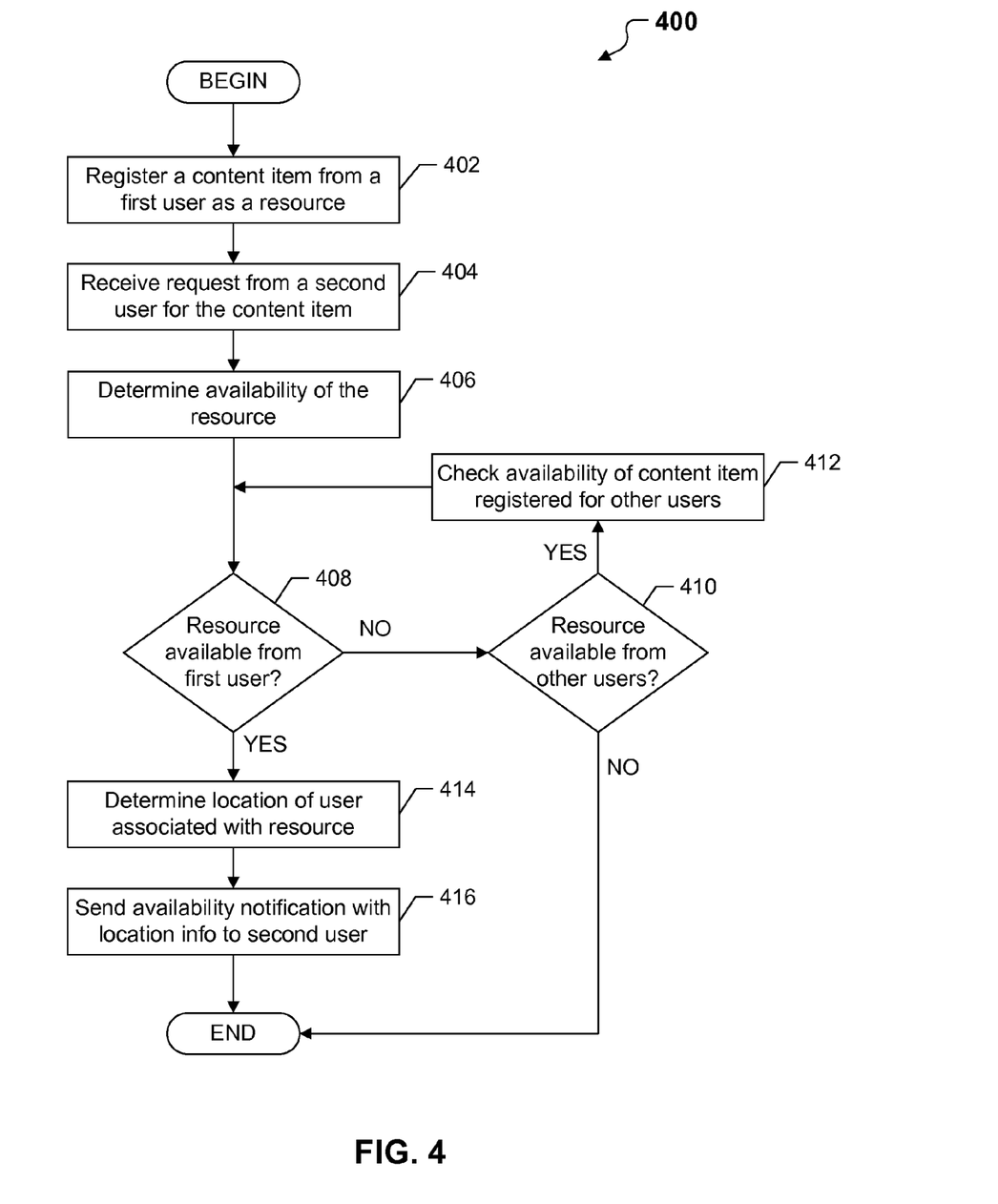
FIG. 4 is a process flow chart of an example method for enabling users of a social networking application or service to register and share resources with other users of the service.

FIG. 4 is a process flow chart of an example method 400 for enabling users of a social networking application or service to register and share resources with other users of the service. For purposes of discussion, method 400 will described using network environment 100 of FIG. 1 and resource registration server 232 of FIG. 2, as described above. However, method 400 is not intended to be limited thereto. For example, the steps of method 400 may be performed by computing system 130 of FIG. 1 or resource registration server 232 and database 234 of FIG. 2, as described above.

Method 400 begins in step 402, which includes registering a content item from a first user of a social networking service as a resource within a social networking service, as described above. The registered resource may be stored by the social networking service in association with a geographic location of the first user. The registered resource may be, for example, an attribute associated with a profile of the first user in the social networking service. Further, the registered resource may be, for example and without limitation, a current, last known or best available geographic location of the first user, a physical possession owned by the first user or information related to a profession (e.g., doctor), professional service, or set of skills associated with the first user in the social networking service.

In step 404, a query for the content item is received from a second user of the social networking service. In response to receiving the query, method 400 proceeds to steps 406 and 408, which include determining for the second user an availability of the resource associated with the first user. In an example, steps 406 and 408 may include determining whether a geographic location of the second user is within a predetermined distance of the geographic location of the first user. In another example, steps 406 and 408 may include determining whether the second user is a member of a social group specified by the first user in the social networking service, wherein the resource is available only to members of the social group.

In yet another example, these steps may include determining availability based on various availability filters or filtering parameters defined by the first user, as described above. Thus, steps 406 and 408 may include, for example, determining whether the geographic location of the first user corresponds to a geographic location of interest defined by the first user. Such a geographic location of interest may correspond to, for example and without limitation, a residence of the first user, a location of a public event or any predetermined geographic region of interest associated with the first user. In some implementations, method 400 may include additional steps based on the above-described filtering parameters. Such additional steps may include, but are not limited to, determining a time of day when the query for the content item from the second user is received and determining whether the time of day is within a period of availability defined by the first user, where the resource is determined to be available only during the period of availability.

If the resource is determined not to be available in steps 406 and 408 based on, for example, registered content items stored in association with a profile of the first user, method 400 proceeds to steps 410 and 412. Steps 410 and 412 include determining whether the queried or requested content item is available as a resource from other users of the social networking service. If the resource is determined to be available (e.g., either from the first user or one or more other users), the geographic location of the first user associated with the resource is determined in step 414 and an availability notification including the determined location is sent to the second user in step 416. The geographic location of the first user received at a mobile device of the second user may be graphically represented on a digital map displayed at the mobile device (e.g., via an interface of a geolocation application executable at the mobile device, as described above).

In some implementations, method 400 may include additional steps for registering the query received from the second user when the resource is determined to be unavailable. For example, the registered query is stored for a predetermined period of time in case an existing resource associated with the first user of the social networking service becomes available (e.g., either shared with the second user in particular or with a social group, of which the second user is a member) or a new resource is registered by the first user or any other user in the social networking service. In an example, the availability notification in step 416 is not sent to the mobile device of the second user until a successful determination of the availability of the resource has been made. Alternatively, an initial availability notification indicating the resource is not available, e.g., from the first user or other specific user (or social group) from which the second user requested the resource, may be sent to the second user's mobile device once such a determination is made. Once the resource becomes available, a subsequent notification indicating that the resource is now available for use may be sent to the mobile device of the second user based on the subsequent determination, as described above.

Figure 5:
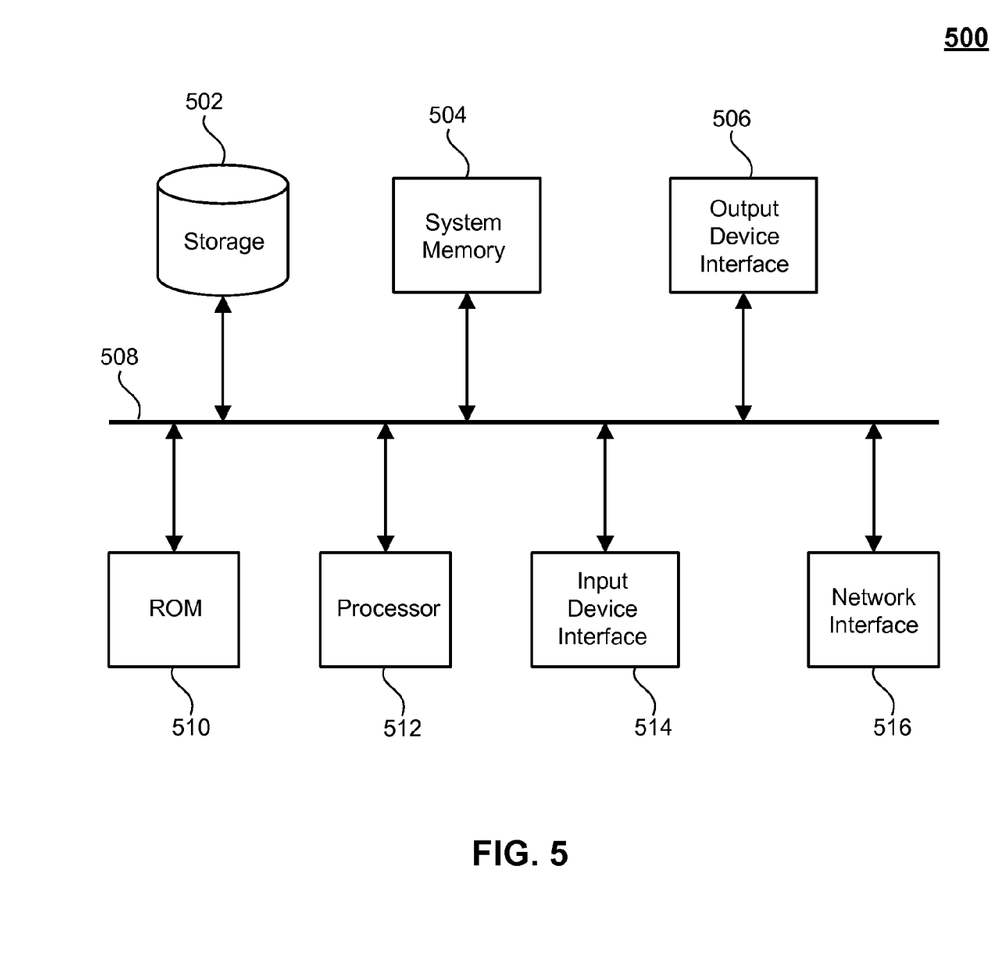
FIG. 5 is a diagram of an example computer system in which some of the subject technology may be implemented.

FIG. 5 conceptually illustrates an example electronic system 500 with which some implementations of the subject technology are implemented. For example, computing system 130 of FIG. 1 or servers 132 and 232 of FIGS. 1 and 2, respectively, as described above, may be implemented using electronic system 500. Electronic system 500 includes various types of computer readable media and interfaces for various other types of computer readable media. As shown in the example of FIG. 5, electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (e.g., a floppy disk, flash drive or disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for performing the steps of method 400 of FIG. 4, as described above, in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
   providing an interface for users of a social networking service to register content items as resources in the social networking service and to request resources registered by other users of the social networking service, each registered resource including location information corresponding to at least one of the respective users associated with the registered resource and one or more availability conditions specified by the respective user for the registered resource in the social networking service;
   responsive to receiving a network request requesting a resource via the interface provided at a mobile device of a first user, determining a current geographic location of the mobile device of the first user;
   identifying at least one second user who has registered the requested resource and is located within a predetermined proximity radius of the current geographic location of the mobile device;
   determining whether the requested resource registered by the identified second user is available for the first user based on the one or more availability conditions specified by the second user for the requested resource;
   registering the network request received from the mobile device of the first user when the requested resource is determined to be unavailable; and
   sending an availability notification to the mobile device of the first user-only when the requested resource is determined to be available such that, when the requested resource is determined to be unavailable, the availability notification is sent to the mobile device of the first user only after a subsequent determination of the availability of the requested resource has been made and the subsequent determination indicates a current availability of the requested resource, wherein the subsequent determination indicating the current availability of the requested resource is based on a change in any of the one or more availability conditions.

2. The method of claim 1, wherein the registered resources include one or more attributes associated with profiles of the respective users in the social networking service.

3. The method of claim 1, wherein the registered resources include physical possessions owned by the respective users.

4. The method of claim 1, wherein the identifying step comprises:
   determining whether a geographic location of the second user is within a predetermined distance of the geographic location of the first user.

5. The method of claim 1, wherein the determining step comprises:
   determining whether the first user is a member of a social group specified by the second user in the social networking service, wherein the resource is available only to members of the social group.

6. The method of claim 1, wherein the availability notification includes a location of the second user derived from the location information associated with the requested resource.

7. The method of claim 1, wherein the determining step comprises:
   determining whether the current geographic location of the mobile device of the first user corresponds to a geographic location of interest defined by the second user.

8. The method of claim 7, wherein the geographic location of interest corresponds to a residence of the second user.

9. The method of claim 7, wherein the geographic location of interest corresponds to a location of a public event.

10. The method of claim 7, wherein the geographic location of interest is within a predetermined geographic region of interest specified by the second user.

11. The method of claim 7, wherein the one or more availability conditions include a time of day, and the determining step further comprising:
    identifying the time of day when the network request from the mobile device of the first user is received; and
    determining whether the identified time of day is within a period of availability specified by the second user, wherein the resource is available only during the specified period of availability.

12. A non-transitory, machine-readable medium comprising instructions stored therein, which when executed by a processor, causes the processor to perform operations comprising:
    registering a content item from a first user of a social networking service as a resource within the social networking service, the registered resource being stored by the social networking service in association with a geographic location of the first user;
    in response to receiving a query for the content item from a second user of the social networking service, determining whether a geographic location of the second user is within a predetermined distance of the geographic location of the first user;
    when the geographic location of the second user is determined to be within the predetermined distance of the geographic location of the first user, determining whether the resource associated with the first user is available for the second user based on one or more availability conditions defined for the resource by the first user in the social networking service;
    when the resource is determined to be available, sending an availability notification indicating the determined availability of the resource to a device of the second user, the availability notification including the geographic location of the first user to be graphically represented on a digital map displayed at the device of the second user; and when the resource is determined to be unavailable, registering the query received from the second user within the social networking service, wherein the availability notification indicating the availability of the resource is sent to the device of the second user after a subsequent determination of the availability of the resource has been made, the subsequent determination indicating the resource is currently available, and wherein the subsequent determination of the availability of the resource is based on a change in any of the one or more availability conditions defined for the resource by the first user.

13. The non-transitory, machine-readable medium of claim 12, wherein the registered resource is an attribute associated with a profile of the first user in the social networking service.

14. The non-transitory, machine-readable medium of claim 12, wherein the registered resource is a physical possession owned by the first user.

15. The machine-readable medium of claim 13, wherein the one or more availability conditions includes members of a social group specified by the first user in the social networking service, wherein the resource is available only to the members of the social group.

16. The non-transitory, machine-readable medium of claim 12, wherein the one or more availability conditions includes a geographic location of interest and a period of time in which the resource is available, wherein the geographic location of interest and the period of time are each defined by the first user via an interface of the social networking service.

17. The non-transitory, machine-readable medium of claim 16, wherein the geographic location of interest corresponds to a residence of the first user.

18. The non-transitory, machine-readable medium of claim 16, wherein the geographic location of interest corresponds to a location of a public event.

19. A system comprising:
a processor; and
a memory accessible to the processor,
wherein the processor is configured to:
register a content item from a first user of a social networking service as a resource within the social networking service, the registered resource being stored by the social networking service in association with a geographic location of the first user;
receive a query for the content item from a second user of the social networking service;
determine whether a geographic location of the second user is within a predetermined distance of the geographic location of the first user;
determine whether the resource associated with the first user is available for the second user based on a determination that the geographic location of the second user is within the predetermined distance of the geographic location of the first user and one or more availability conditions defined for the resource by the first user in the social networking service, the one or more availability conditions including a geographic location of interest and a period of time defined by the first user via an interface of the social networking service;
register the query received from the second user within the social networking service based on an initial determination that the resource is unavailable; and
send an availability notification indicating the determination of availability of the resource to a device of the second user based on a subsequent determination that the resource is currently available, the availability notification including the geographic location of the first user to be graphically represented on a digital map displayed at the device of the second user, wherein the subsequent determination that the resource is available is based on a change in any of the one or more availability conditions defined for the resource by the first user.

* * * * *